(12) United States Patent
Bayrakdar

(10) Patent No.: US 9,879,793 B2
(45) Date of Patent: Jan. 30, 2018

(54) CONTROL VALVE FOR A CAMSHAFT ADJUSTER

(71) Applicant: Schaeffler Technologies GmbH & Co. KG, Herzogenaurach (DE)

(72) Inventor: Ali Bayrakdar, Rothenbach/Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/402,521

(22) PCT Filed: Mar. 8, 2013

(86) PCT No.: PCT/EP2013/054756
§ 371 (c)(1),
(2) Date: Nov. 20, 2014

(87) PCT Pub. No.: WO2013/174532
PCT Pub. Date: Nov. 28, 2013

(65) Prior Publication Data
US 2015/0129066 A1    May 14, 2015

(30) Foreign Application Priority Data

May 25, 2012  (DE) .................. 10 2012 208 812

(51) Int. Cl.
*F16K 11/07* (2006.01)
*F16K 15/18* (2006.01)
*F01L 1/344* (2006.01)

(52) U.S. Cl.
CPC ............ *F16K 15/183* (2013.01); *F01L 1/344* (2013.01); *F01L 1/3442* (2013.01); *F01L 2001/34426* (2013.01); *Y10T 137/88054* (2015.04)

(58) Field of Classification Search
CPC ....... Y10T 137/86051; Y10T 137/8663; Y10T 137/8667; Y10T 137/86887; Y10T 137/86694; Y10T 137/86702; Y10T 137/88054; F01L 1/3442; F01L 2001/34426; F01L 1/344; F16K 15/183
(Continued)

(56) References Cited

U.S. PATENT DOCUMENTS 6,971,353 B2 * 12/2005 Heinze .................... F01L 1/022
                                                    123/90.15
7,487,752 B2 *  2/2009 Strauss ................... F01L 1/022
                                                    123/90.17
(Continued)

FOREIGN PATENT DOCUMENTS

CN       1724852 A     1/2006
DE     102004035035    3/2005
(Continued)

*Primary Examiner* — Craig J Price
(74) *Attorney, Agent, or Firm* — Volpe and Koenig, P.C.

(57) ABSTRACT

A control valve (4) for controlling pressure medium flows of a camshaft adjuster which includes a substantially hollow cylindrical valve housing (6), a control piston (12), which is guided axially displaceably inside the valve housing (6), and a non-return valve (22) which can be hydraulically released. In a region of a pressure medium inlet, the valve housing (6) includes a housing shaft (28) with an axial inflow bore (30) which widens in funnel-like manner towards the inlet side.

10 Claims, 2 Drawing Sheets

(58) Field of Classification Search
USPC ............ 137/596.18, 625.25, 625.49, 625.66, 137/625.67, 628.68; 123/90.12, 90.13, 123/90.15, 90.17, 90.18, 90.27, 90.31
See application file for complete search history.

(56) References Cited

U.S. PATENT DOCUMENTS

| | | | |
|---|---|---|---|
| 7,681,542 B2* | 3/2010 | Paul .................... | F01L 1/34409 123/90.15 |
| 8,511,346 B2* | 8/2013 | Scheidig et al. ......... | 137/625.66 |
| 8,522,733 B2* | 9/2013 | Hoppe et al. ............. | 123/90.15 |
| 8,567,360 B2* | 10/2013 | Bayrakdar ................ | 123/90.17 |
| 8,573,167 B2* | 11/2013 | Chen et al. ................ | 123/90.12 |
| 8,662,039 B2* | 3/2014 | Fischer et al. ............. | 123/90.17 |
| 8,677,956 B2* | 3/2014 | Chang ...................... | F01L 1/34 123/90.12 |
| 8,752,514 B2* | 6/2014 | Schulze et al. ............ | 123/90.17 |
| 8,776,744 B2* | 7/2014 | Bayrakdar ................ | 123/90.17 |
| 8,910,602 B2* | 12/2014 | Bohner ..................... | F01L 1/46 123/90.17 |
| 2005/0056249 A1 | 3/2005 | Heinze et al. | |
| 2005/0066924 A1 | 3/2005 | Lehmann et al. | |
| 2005/0103294 A1 | 5/2005 | Heinze et al. | |
| 2005/0257764 A1 | 11/2005 | Lehmann et al. | |
| 2006/0191503 A1* | 8/2006 | Geyer et al. ............... | 123/90.15 |
| 2007/0095315 A1* | 5/2007 | Hoppe et al. .............. | 123/90.17 |
| 2008/0149057 A1 | 6/2008 | Grunow et al. | |
| 2010/0084019 A1 | 4/2010 | Burke | |
| 2010/0288384 A1 | 11/2010 | Hoppe et al. | |
| 2011/0192366 A1* | 8/2011 | Gramkow ............. | F01L 1/3442 123/90.17 |
| 2015/0292367 A1* | 10/2015 | Bayrakdar ........... | F01L 1/3442 123/90.17 |
| 2015/0300211 A1* | 10/2015 | Bayrakdar ........... | F01L 1/3442 123/90.17 |
| 2016/0298504 A1* | 10/2016 | Kobayashi ........... | F01L 1/3442 |

FOREIGN PATENT DOCUMENTS

| | | |
|---|---|---|
| DE | 10346443 | 5/2005 |
| DE | 102005034276 | 1/2007 |
| DE | 102008004591 | 7/2009 |
| DE | 102008051386 | 4/2010 |
| DE | 102009043154 | 4/2010 |
| DE | 102010050813 | 5/2012 |
| EP | 1767749 | 3/2007 |
| WO | 2006127347 | 11/2006 |

* cited by examiner

CONTROL VALVE FOR A CAMSHAFT ADJUSTER

FIELD OF THE INVENTION

The invention relates to a control valve for controlling flows of pressurized medium of a camshaft adjuster, wherein this control valve comprises an essentially hollow cylindrical valve housing, a guided control piston that can move in the axial direction inside the valve housing, and a non-return valve that can be released hydraulically.

BACKGROUND

In an internal combustion engine of a motor vehicle, a camshaft that is in driven connection with a crankshaft is typically used for actuating the gas exchange valves. Here it has proven advantageous to be able to change the opening and closing times of the gas exchange valves while the internal combustion engine is running. By adjusting the opening and closing times, for example, as a function of the current rotational speed, in particular, the fuel consumption can be reduced, the exhaust gas behavior can be positively influenced, and the engine efficiency can be increased.

The variability of the gas exchange valve control times is usually achieved through a relative change of the phase position of the camshaft relative to the crankshaft. For this purpose, typically a so-called camshaft adjuster is integrated into the drive train by means of which the torque is transferred from the crankshaft to the camshaft. The mounting of modern camshaft adjusters is located, for example, on the drive-side end of the camshaft, on an intermediate shaft, on a non-rotating component, or on the crankshaft.

The crankshaft adjuster is here constructed such that, during the operation, the phase position between the crankshaft and camshaft can be reliably maintained and if necessary the camshaft can be rotated in a certain angle range relative to the crankshaft. For this purpose, the camshaft adjuster is formed essentially with at least two pressure chambers acting against each other. Through targeted connection of the pressure chambers with a pressurized medium pump or with a pressurized medium tank, the phase of the camshaft can be adjusted or maintained relative to the crankshaft.

The pressurized medium supply to the pressure chambers and the pressurized medium discharge from the pressure chambers is usually controlled by means of a control valve, usually in the form of a multiple-path gate valve. This typically comprises, as essential components, a valve housing and a control piston that is held in a housing hollow space so that it can move in the axial direction and that is actuated by an actuator, typically an electromagnet. The control valve also has, in particular, a pressurized medium connection, a discharge connection and work connections by means of which the pressurized medium can be injected into a pressure chamber or discharged out from a pressure chamber. Depending on the position of the control piston, for example, one of the pressure chambers is connected to the supply connection via one of the work connections and is filled with pressurized medium. At the same time, the opposing pressure chamber communicates via the work connection allocated to it with the discharge connection on the control valve and is in this way emptied.

In one common construction, such a control valve is constructed, for example, as a so-called central valve that is inserted into a central hole of the camshaft adjuster and is screwed to the camshaft.

A control valve of the type noted above is disclosed, for example, in DE 10 2008 004 591 A1. The illustrated control valve for controlling pressurized medium flows of a camshaft adjuster of an internal combustion engine comprises an essentially hollow cylindrical valve housing in which a hollow pressurized medium guide insert is inserted. Within the pressurized medium guide insert, there is a control sleeve in which a guided control piston sits that can move in the axial direction. In the valve housing, a radial hole is formed that is used as a pressurized medium supply and is connected to a pressurized medium pump for feeding pressurized medium. A hydraulically releasable non-return valve is also used in the region of the pressurized medium supply.

SUMMARY

The present invention is based on the objective of providing a control valve that makes possible an optimized supply of pressurized medium.

This objective is met according to the invention by a control valve for controlling flows of pressurized medium of a camshaft adjuster, wherein this control valve has a valve housing with an essentially hollow cylindrical construction, a guided control piston that can move inside the valve housing in the axial direction, and a hydraulically releasable non-return valve. Here, the valve housing has, in the area of a pressurized medium supply, a housing shaft with an axial supply hole that is widened like a funnel toward the inlet side.

The invention here starts, in a first step, from the idea that an increase in the adjustment speed of a camshaft adjuster can be achieved through an increased volume flow of pressurized medium. The invention also starts from the idea that this can be promoted, in particular, through an optimized pressurized medium supply in the control valve.

In a next step, the invention considers that the control valve is often designed so that the pressurized medium is input into the control valve centrally "from the front" from an axial direction. However, the pressurized medium supply to the inlet area of the control valve is regularly realized from the radial direction, for example, through a radial hole in the camshaft. In other words, the pressurized medium, in order to enter into the control valve, must be "deflected" from the radial direction to a certain extent by 90° in the axial direction, which has a negative effect on the volume flow of the pressurized medium.

Therefore, the invention plans to expand the inlet opening of the control valve through which the pressurized medium enters into the control valve in the shape of a funnel, in order to achieve, in this way, an improved inlet of the pressurized medium into the control valve. This funnel-shaped expansion is simple to produce and also no additional components must be provided for this expansion.

The axial supply hole is formed, in particular, centered in the housing shaft and extends from the axially outer end of the housing shaft essentially up to the non-return valve connected downstream in terms of flow. The pressurized medium enters into the control valve at the axially outer end of the housing shaft, in particular, via a radial hole that is arranged in the region of the axial end of the housing shaft and is connected to a pressurized medium pump in a communicating manner.

The funnel-shaped expansion of the axial supply hole extends toward the inlet side axially from a region inside the housing shaft essentially up to the axially outer end of the housing shaft.

The construction according to the invention has the advantage that, in this way, an optimized pressurized medium supply into a control valve is made possible. In particular, for a radial pressurized medium supply, the pressurized medium does not need to be "deflected" by 90°, in order to then flow into the control valve via the axially directed supply hole of the housing shaft, which simplifies the "redirection" from a radial into an axial direction. Furthermore, additional space for the pressurized medium is created by the enlarged hole diameter in the region of the funnel-shaped expansion.

The supply hole is preferably widened in a funnel shape in a region from the non-return valve up to the inlet side. In other words, the funnel-shaped expansion of the supply hole extends in this case essentially in a region from the non-return valve up to the axially outer end of the housing shaft. In this way, additional space can be provided for the pressurized medium.

In one advantageous embodiment, the housing shaft has, on its axial end, a thread, wherein the wall thickness of the housing shaft is reduced by a narrowing of the outside diameter in an axial region between the non-return valve and thread. This construction for the valve housing is, in particular, a central screw that connects a camshaft adjuster to a camshaft. By means of the thread that is, in particular, an external thread, the control valve can be screwed, in particular, to the internal thread of a camshaft. Through the narrowing of the outer diameter of the housing shaft in the axial region between the non-return valve and thread, a waisted shank is formed in this region. In this way, the valve housing constructed, in particular, as a central screw, has an increased elasticity, wherein an increased elastic change in length is possible by screwing in with a pretensioning. Time varying changes in force and length occurring during operation can also be absorbed by an elastic elongation of the waisted shank. This has an overall positive effect on the durability of the screw connection.

Advantageously, a filter element is arranged in the supply hole. The filter element is used, in particular, to hold back contaminating particles possibly contained in the pressurized medium. The rod-shaped filter element in particular extends essentially axially along the supply hole and is arranged coaxially in this hole. Here, the radial extent of the filter element is less than the smallest diameter of the supply hole, so that an intermediate space for the incoming pressurized medium is formed between the filter element and the radially inner circumferential surface of the housing shaft formed by the supply hole. The funnel-shaped extension of the supply hole here contributes to the fact that incoming pressurized medium comes into the filter element over the biggest area possible.

BRIEF DESCRIPTION OF THE DRAWINGS

Embodiments of the invention are explained in more detail below with reference to a drawing. Shown are.

DETAILED DESCRIPTION OF THE PREFERRED EMBODIMENTS

Figure 1:
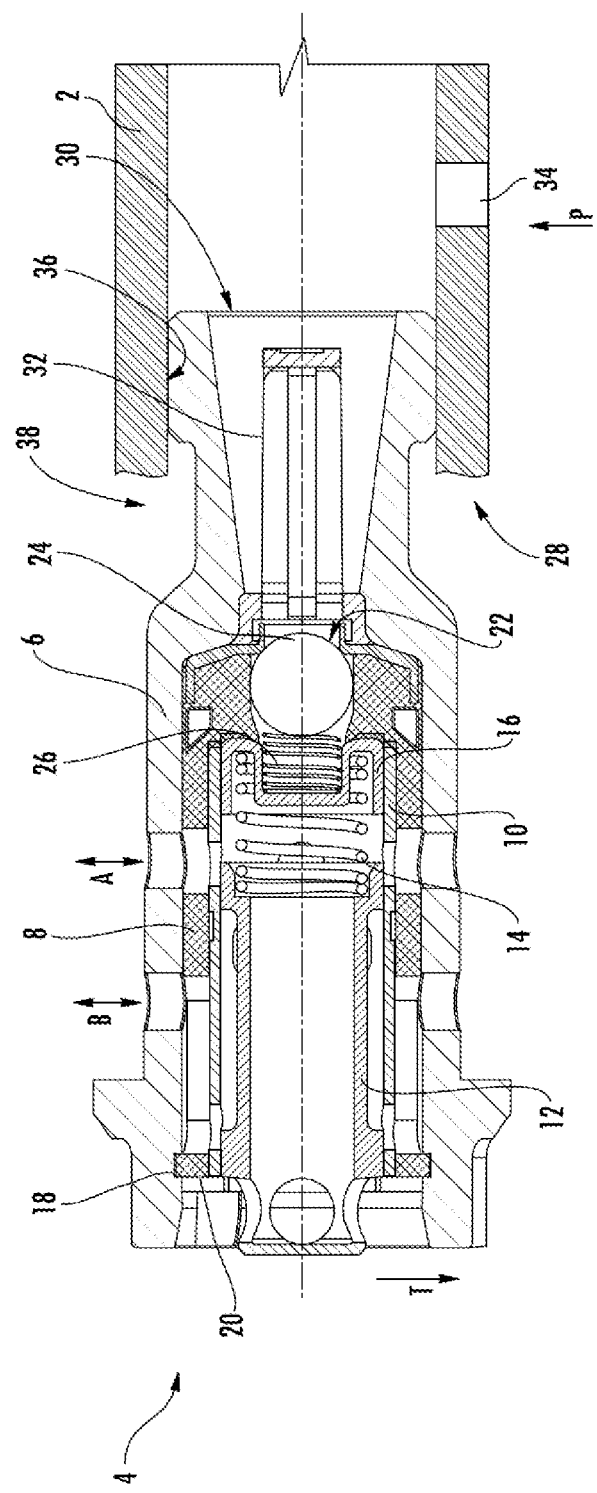
FIG. 1 in a schematic representation, a control valve arranged in a camshaft, and
FIG. 2 a control valve in an alternative embodiment.

In FIG. 1, an embodiment of a control valve 4 arranged in a camshaft 2 is shown. The control valve 4 is constructed in the form of a central valve and can be inserted for its use in a central hole of a camshaft adjuster (not shown).

The control valve 4 here comprises an essentially hollow cylindrical valve housing 6 that is constructed in the form of a central screw according to the form of the control valve 4 as a central valve. In the housing hollow space, a hollow pressurized medium guide insert 8 made from plastic is inserted. Here, the outer diameter of the pressurized medium guide insert 8 is adapted to the inner diameter of the housing hollow space. Inside the pressurized medium guide insert 8, a hollow cylindrical control sleeve 10 is arranged whose outer diameter is adapted to the inner diameter of the pressurized medium guide insert 8. Inside the control sleeve 10 there is a control piston 12 formed as a hollow piston that can move in the axial direction.

The control piston 12 can be shifted against the spring force of a spring element 14 that is supported on a spring bearing 16. For this purpose, an actuator, for example, an electromagnet with a plunger, can contact the axially outer end side of the control piston 12. An axial sliding of the control piston 12, control sleeve 10, and/or pressurized medium insert 8 from the valve housing 6 caused, in particular, by the spring force of the spring element 14 is prevented by a securing ring 20 arranged in a groove 18 of the valve housing.

Inside the valve housing 6 there is also a hydraulically releasable non-return valve 22 whose closing body 24 is loaded with an axial force by a spring 26 that is supported on the spring bearing 16. In a housing shaft 28 of the valve housing 6 there is also a supply hole 30 in which a filter element 32 is arranged coaxially. The use of the filter element 32 prevents contaminating particles from reaching into the control valve 4 with the pressurized medium entering into the control valve 4, wherein, in particular, the control valve 4 is protected from functional disruptions.

In the valve housing there are also work connections A, B for the pressurized medium chambers of the camshaft adjuster working in opposite directions and also a discharge connection T. Via a radial hole 34 in the camshaft, pressurized medium is fed to the control valve 4 as needed via a supply connection P not shown in more detail for a pressurized medium, for example, oil, wherein a supply direction of the pressurized medium is indicated with the arrow P. Thus, the pressurized medium is supplied to the inlet region of the control valve 4 from a radial direction, wherein the pressurized medium then flows via the axially directed supply hole 30 of the housing shaft 28 into the control valve 4. As a function of the position of the axially guided control piston 12, the supply connection P is connected to one of the work connections A, B, while the other work connection A, B is connected to the discharge connection T.

To improve the pressurized medium supply into the control valve 4 and therefore to achieve overall an increased pressurized medium volume flow, the supply hole 30 is expanded in a funnel shape toward the pressurized medium inlet side. Therefore, the pressurized medium flowing from the radial direction through the radial hole 34 does not have to be "deflected" by 90° for entry into the supply hole 30 of the control valve 4. This arrangement permits an optimized pressurized medium supply into the control valve 4. Furthermore, additional space for the pressurized medium is created by the increased hole diameter in the region of the funnel-shaped expansion.

In addition, the housing shaft 28 has, on its axial end, a thread 36 that is constructed as an external thread and by means of which the control valve 4 is screwed to the camshaft 2. Through a narrowing of the outer diameter of the housing shaft 28 in the axial region between the non-return valve 22 and thread 36, a waisted shank 38 is formed in this region. The funnel shaped expansion abuts the base of the filter element 32, and extends past an outermost end of the filter 32 to the supply inlet hole 30. Therefore, the valve housing has increased elasticity, wherein, by being screwed in with pretensioning, an increased elastic change in length is possible. Time varying changes in force and length occurring during operation can also be absorbed by an elastic elongation of the waisted shank. This has an overall positive effect on the durability of the screw connection.

Figure 2:
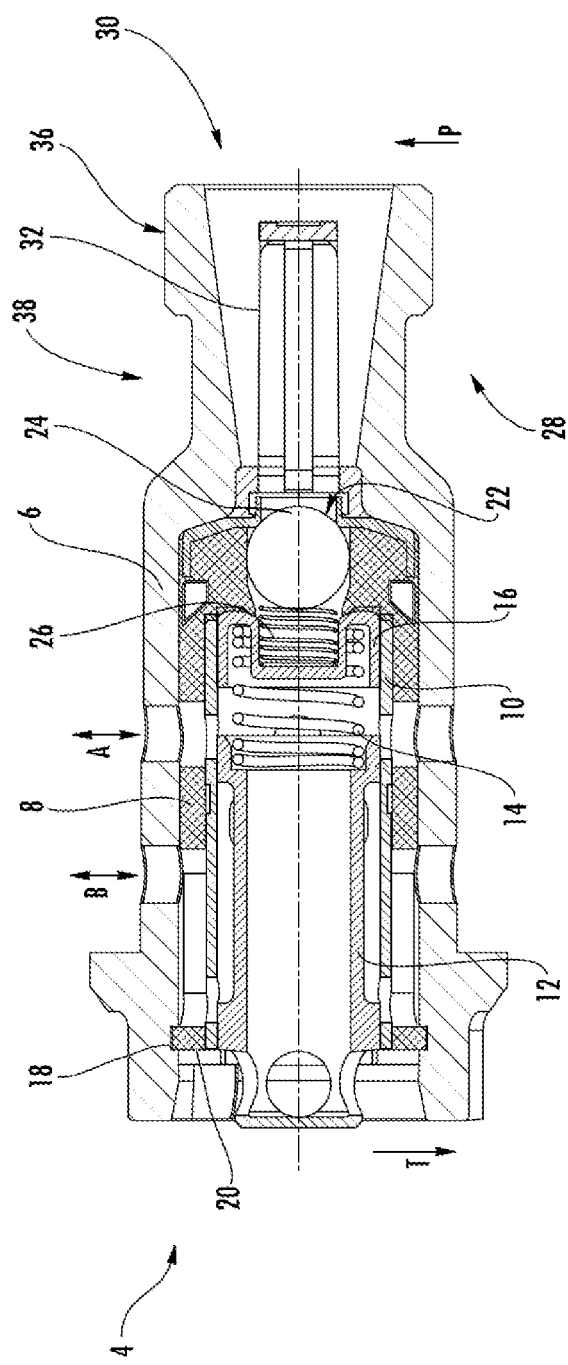

FIG. 2 shows a control valve 4 in an alternative embodiment. The control valve 4 shown here corresponds to the valve shown in FIG. 1 and differs only in that the supply hole 30 is widened in the shape of a funnel essentially in a region from the non-return valve 22 up to the inlet side of the pressurized medium. In other words, here the funnel-shaped expansion of the supply hole 30 extends essentially in a region from the non-return valve 22 up to the axially outer end of the housing shaft 28. In this way, additional space can be provided for the pressurized medium and this also leads to the fact that pressurized medium comes into the filter element 32 over the biggest area possible.

LIST OF REFERENCE NUMBERS

2 Camshaft
4 Control valve
6 Valve housing
8 Pressurized medium insert
10 Control sleeve
12 Control piston
14 Spring element
16 Spring bearing
18 Groove
20 Securing ring
22 Non-return valve
24 Closure body
26 Spring
28 Housing shaft
30 Supply hole
32 Filter element
34 Radial hole
36 Thread
38 Waisted shank
A, B Work connection
T Discharge connection
P Supply connection

The invention claimed is:

1. A control valve for controlling flows of pressurized medium of a camshaft adjuster, said control valve comprising:
    an essentially hollow cylindrical valve housing,
    a guided control piston movable in an axial direction inside the valve housing,
    a non-return valve that is releasable hydraulically; and
    a filter,
    the valve housing including, in an area of a pressurized medium supply, a housing shaft with an axial supply hole that includes a funnel portion formed by a sidewall that gradually widens in a funnel shape toward an inlet of the axial supply hole,
    wherein the filter is disposed entirely in the axial supply hole,
    wherein a base of the filter is positioned adjacent to the non-return valve,
    wherein the funnel portion abuts the base of the filter and extends past an outermost end of the filter, and
    wherein the filter extends coaxially with the axial supply hole and is spaced from the sidewall in a radial direction such that a gap is formed between the filter and the sidewall, and
    wherein the gap extends along an entire distance of the filter such that the filter does not contact the sidewall.

2. The control valve according to claim 1, further including a thread on an axial end of the housing shaft, and
    wherein a wall thickness of the housing shaft is decreased in an axial region between the non-return valve and the thread by a reduction of an outer diameter.

3. The control valve according to claim 1, further comprising a hollow pressurized medium guide insert positioned in a hollow space of the valve housing.

4. The control valve according to claim 3, wherein an outer diameter of the pressurized medium guide insert is adapted to an inner diameter of the valve housing hollow space.

5. The control valve according to claim 3, further comprising a hollow cylindrical control sleeve arranged inside the pressurized medium guide insert.

6. The control valve according to claim 5, wherein the guided control piston is positioned inside the hollow cylindrical control sleeve.

7. The control valve according to claim 6, further comprising a securing ring arranged in a groove of the valve housing, the securing ring preventing an axial sliding of the control piston the control sleeve, or the pressurized medium guide insert.

8. The control valve according to claim 1, wherein the guided control piston is shifted against the force of a spring element that is supported on a spring bearing.

9. The control valve according to claim 1, further comprising first and second work connections and a discharge connection formed in the valve housing.

10. The control valve according to claim 9, wherein a supply connection is connected to the first or second work connection and the other of the first and second work connections is connected to the discharge connection as a function of the position of the guided control piston.

* * * * *